United States Patent [19]
Ravndal et al.

[11] Patent Number: 5,330,259
[45] Date of Patent: Jul. 19, 1994

[54] ELECTROHYDRAULIC BRAKING SYSTEM WITH REMOTE BOOSTER

[75] Inventors: Seth C. Ravndal, South Bend; Daniel J. Patient, Granger, both of Ind.

[73] Assignee: AlliedSignal Inc., Morristown, N.J.

[21] Appl. No.: 995,247

[22] Filed: Dec. 22, 1992

[51] Int. Cl.$^5$ .......................... B60T 8/42; B60T 13/20
[52] U.S. Cl. ............... 303/115.4; 303/116.2; 60/555; 60/560
[58] Field of Search ............ 303/116.2, 115.4, 115.5, 303/114.1, 113.5, 10, 11; 60/555, 556, 557, 558, 559, 560, 563, 565

[56] References Cited

U.S. PATENT DOCUMENTS

| | | |
|---|---|---|
| 4,523,792 | 6/1985 | Belart et al. ................. 303/115.4 X |
| 4,932,728 | 6/1990 | Schenk et al. ............... 303/115.4 X |
| 5,026,123 | 6/1991 | Nokubo et al. .............. 303/115.4 X |
| 5,061,016 | 10/1991 | Hirobe ............................. 303/114.1 |
| 5,244,260 | 9/1993 | Kervagoret .................. 303/117.1 X |

Primary Examiner—Robert J. Oberleitner
Assistant Examiner—Kevin D. Rutherford
Attorney, Agent, or Firm—Markell Seitzman

[57] ABSTRACT

A brake system (10) comprising: a master cylinder (20) including a primary (24) and a secondary (26) chamber and a reservoir (26); an accumulator (40), a pump (42) having first inlet port connected to a reservoir (26) of the master cylinder (20) and the second outlet port (b) connected to the accumulator (40), a motor (50) for selectively driving the pump as a function of system pressure, a pressure boost mechanism (60) connected to the accumulator (40) and the primary and secondary chambers of the master cylinder for generating a boosted pressure at a fixed multiple of the pressure in either the primary or secondary master cylinder chambers.

2 Claims, 3 Drawing Sheets

ELECTROHYDRAULIC BRAKING SYSTEM WITH REMOTE BOOSTER

BACKGROUND AND SUMMARY OF THE INVENTION

The present invention relates to a brake system for a vehicle which utilizes a hydraulic boost mechanism as replacement for the more usual vacuum booster.

The present invention comprises: a brake system comprising: a plurality of hydraulic brake mechanisms, associated with each wheel of a vehicle; a master cylinder including primary and secondary chambers and a reservoir and a pressure boost device. The pressure boost device comprising: an accumulator and a pump connected the reservoir and to the accumulator. A motor is provided to selectively drive the pump as a function of system pressure. The pressure boost device is also connected to the primary and secondary chambers of the master cylinder for generating a boosted pressure at a fixed multiple of the pressure in either the primary or secondary master cylinder chambers. First and second isolation valves are provided to isolate the master cylinder from brake cylinders during normal brake operation and first and second proportional solenoid valves provide an antilock or adaptive braking mode of operation.

It is an object of the present invention to provide a brake system for a vehicle in which the brake pressure generated during normal brake operation is obtained by utilizing a pressure boost device or mechanism that is remotely situated from the master cylinder.

Many other objects and purposes of the invention will be clear from the following detailed description of the drawings.

DETAILED DESCRIPTION OF THE DRAWINGS

Figure 1:
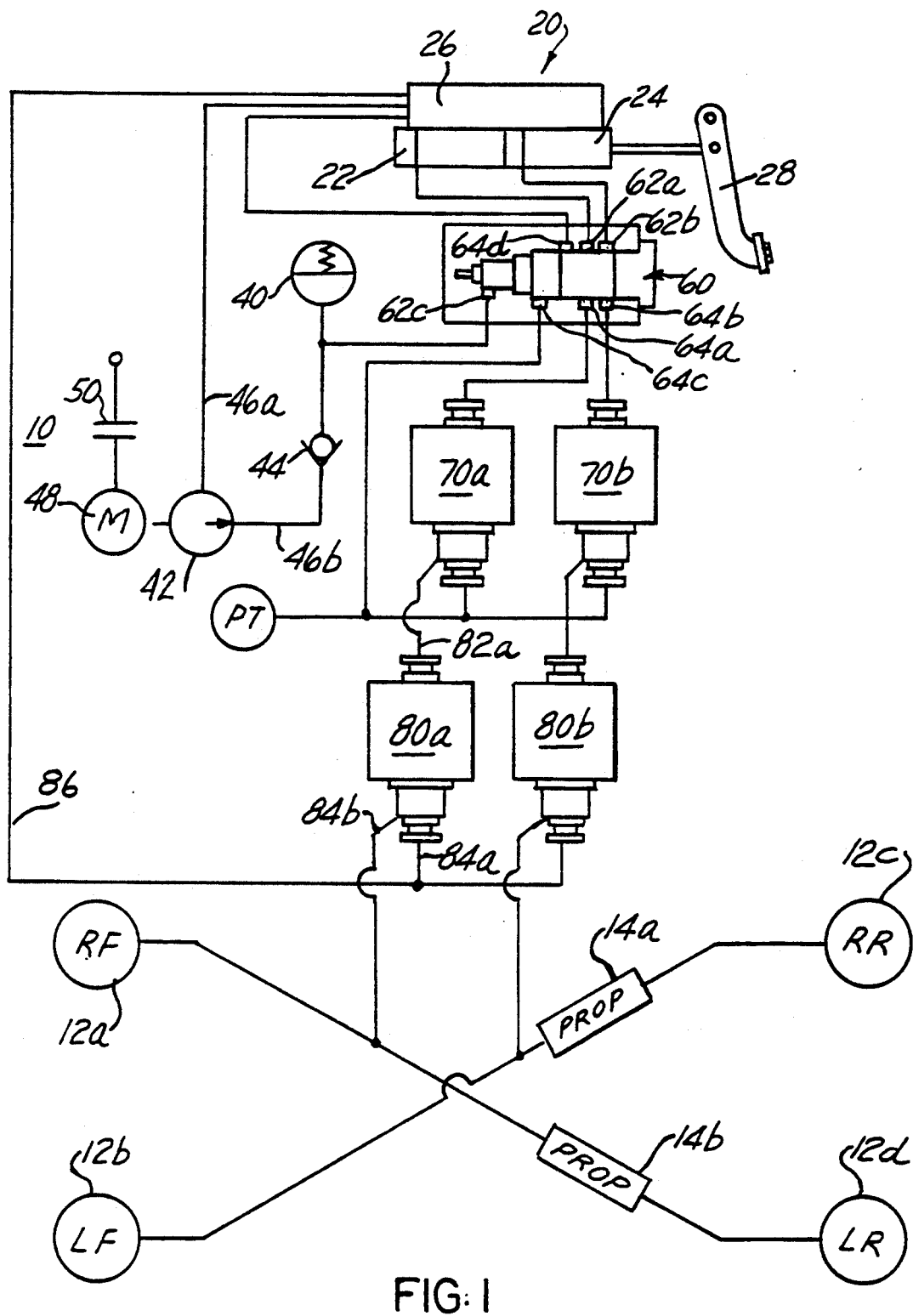
FIG. 1 diagramatically illustrates many of the major components of the present invention.

FIG. 1 illustrates a brake system 10 which is used to energize a plurality of brake cylinders 12a-d arranged in a cross-split configuration. Brake cylinders 12a and 12b are representative of the right front and left front brake cylinders respectively and brake cylinders 12c and 12d are representative of the rear right and rear left brake cylinders respectively. Upstream of each rear brake cylinder 12c and 12d is a proportioning valve 14a and 14b. The brake system includes a master cylinder 20 of known variety comprising a primary chamber 22, a secondary chamber 24 and a reservoir 26. Included within the master cylinder and not shown are a plurality of pistons which are moved by the brake pedal 28 in a known manner. The primary and secondary chambers are communicated to a boost mechanism generally shown as 60. The boost mechanism includes a first inlet port 62a and a second inlet port 62b communicated to the primary and secondary master cylinder chambers respectively. The boost mechanism additionally includes a first outlet port 64a communicated to a first isolation valve 70a and a second outlet port 64b communicated to a second isolation valve 70b. The boost mechanism 60 additionally includes a third inlet port 62c which is communicated to an accumulator 40, a boost pressure outlet port 64c and a return port 64d connected to the reservoir 26. The accumulator 40 is pressurized by a pump 42 which is typically a piston type of pump through a check valve 44. The pump includes a first inlet port 46a communicated to the reservoir and a second outlet port 4b communicated to the check valve. The pump 42 may be powered by a constant speed motor 48. The purpose of the motor 48 and pump 42 is to keep the accumulator 40 pressurized at a relatively high pressure such as approximately 2,000 psi (13,801 Kpa). The motor 48 is activated via a pressure sensitive switch 50 which senses accumulator pressure less than a pre-set level.

As mentioned, the boost mechanism 60 is communicated to a plurality of isolation valves 70a and 70b. The purpose of each of the isolation valves is to isolate the master cylinder 20 from the downstream located brake cylinders 12a-d when the boost pressure is above a predetermined level and to communicate the pressure generated within each of the primary and secondary chambers 22 and 24 respectively to the brake cylinders in the event of a failure of the system to generate a boost pressure of an adequate pressure level. FIG. 1 shows each of the isolation valves 70a and 70b as a diagrammatic element. As can be appreciated, the isolation valve can be an electrically actuated valve or alternatively a differential pressure activated valve. Electric activation provides more options for improved performance in certain failure modes, but is more expensive.

Figure 2:
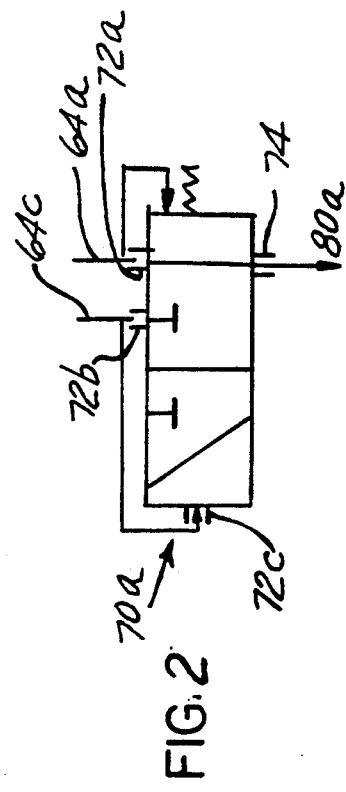
FIG. 2 diagramatically illustrates a differential pressure type isolation valve.

Reference is briefly made to FIG. 2 which diagramatically illustrates the function of either isolation valve 70a or 70b. More specifically, FIG. 2 illustrates a differential pressure actuated isolation valve 70a in which master cylinder pressure (primary or secondary chamber pressure) is communicated to an inlet port 72a from the outlet port 64a of the mechanism 60. Boost pressure is also communicated to a second inlet port 72b from the outlet port 64c and to a third inlet 72c in communication with a piston located therein. The isolation valve includes a single outlet port 74 which is communicated to a proportional solenoid valve 80a discussed below. The isolation valve 70a is shown in its operating state wherein master cylinder pressure is communicated to the proportional solenoid valve 80a through the isolation valve. Upon operation of the system, that is upon generation of a boost pressure greater than the pressure generated within the master cylinder, each isolation valve changes state so that primary master cylinder pressure, for example, is no longer communicated to the proportional solenoid valve 80a and the boost pressure received at inlet port 72b is communicated to the outlet port 74 and then to the proportional valve 80a. The operation of isolation valve 70b is identical to 70a with the exception that it is communicated to the secondary chamber 24 of the master cylinder and its outlet port 74 is communicated to a second proportional solenoid valve 80b. The purpose of the electrically controlled proportional solenoid valve 80a or 80b is to provide a controlled flow path to the brake cylinders 12a-d and from the brake cylinders to the reservoir 26 to provide the brake system 10 with an adaptive braking system mode of operation. One such proportional solenoid that can be utilized in the present invention is disclosed in U.S. Pat. No. 5,244,260 which is incorporated herein by reference.

Each solenoid valve such as 80a includes an inlet port 82 and a first outlet port 84a and a second outlet port 84b. During normal service brake operation, the proportional solenoid valve merely functions as a conduit to communicate the brake fluid exiting the isolation valve 70a and 70b to one or more of the brake cylinders 12a-d. As can be seen, proportional solenoid valve 80a feeds the right front brake cylinder 12a and the left rear brake cylinder 12d. Similarly, proportional solenoid valve 80b feeds the left front brake cylinder 12b and the right rear brake cylinder 12c. During the adaptive braking mode of operation of the system, that is, when an associated wheel speed sensor (not shown) and electric control unit indicates that one or more of the wheels of the vehicle is in an impending skid condition, the respective proportional solenoid valve is controlled to decay the brake pressure in designated brake cylinders by permitting the fluid therein to enter the outlet port 84b, flow through the other outlet port 84a and enter the reservoir 26 via the hydraulic line 86. In other instances the proportional valve is commanded to maintain the pressure within the brake cylinder wherein flow out of the brake cylinder is prohibited and finally, the proportional solenoid valve is commanded to controllably permit the hydraulic pressure to increase in a proportional manner under control of electric control unit in which the proportional solenoid valve such as 80a communicates the brake fluid received at its inlet port 82 to its outlet port 84b and then to the designated brake cylinder (12a,b,c and/or d).

Figure 3:
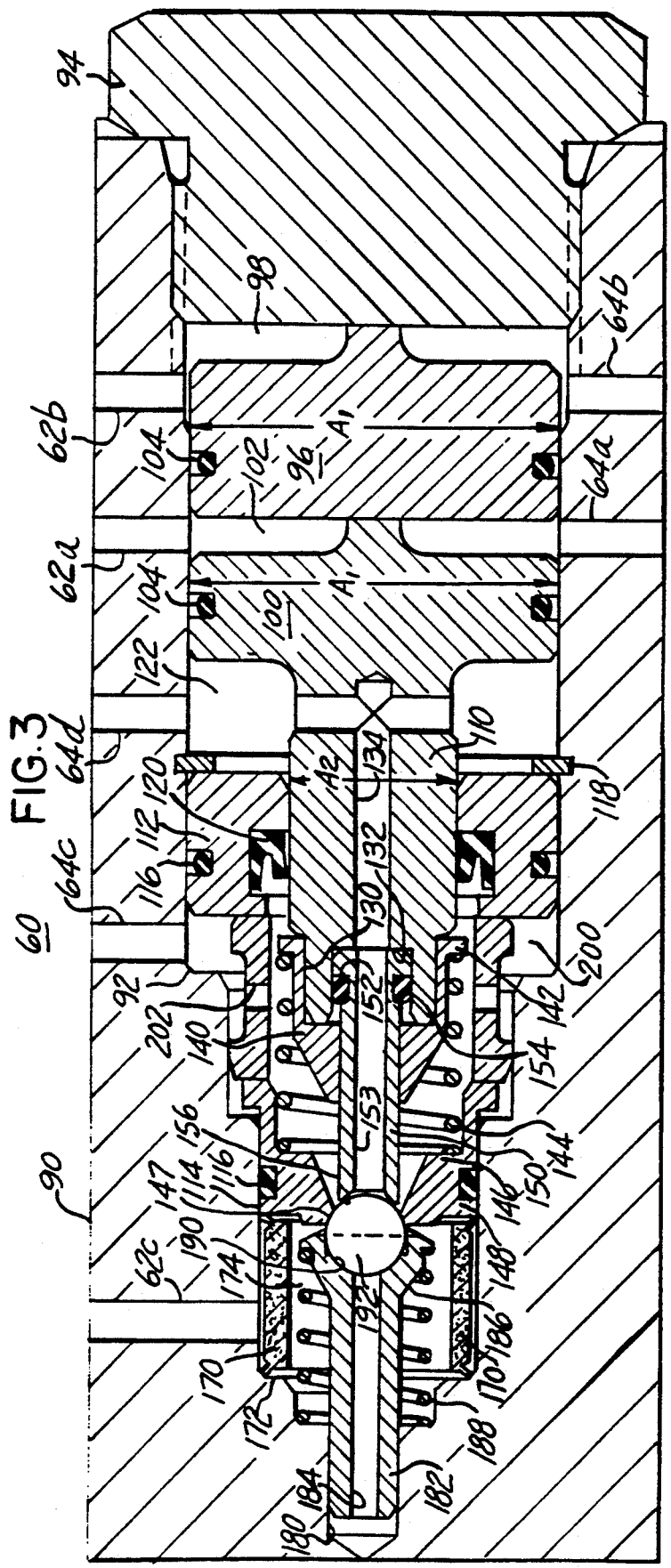
FIG. 3 illustrates a cross-sectional view of a pressure boost mechanism.

Reference is now made to FIG. 3 which illustrates a more detailed view of the boost mechanism 60. The boost mechanism 60 comprises a housing 90 which includes a stepped bore 92, the various inlet and outlet ports 62 and 64 communicate with the stepped bore 92 along its length. The bore 92 is enclosed in a cap 94. Situated within the bore is a first piston 96 which forms a pressure chamber 98 and a second piston 100 which forms in concert with piston 96 a second pressure chamber 102. Each of the pistons 96 and 100 includes an edge seal such as 104 which may be fabricated of an O-ring. Situated downstream or to the left of piston 100 as illustrated in FIG. 3, is a third piston 110 that is slidably received within a housing member 112 which extends downwardly to a lower portion 114 of the stepped bore 92. Appropriate seals 116 are provided to prohibit leakage. The housing member 112 is retained in place by a washer 118. The housing meter 112 supports a dynamic seal 120 such as a lip seal which engages the walls of the third piston. The chamber 122 between the second and third pistons is communicated to the reservoir 26 via the outlet port 64d. The third piston includes a tapered end 130 and an end bore 132 communicated to a through bore 134. Slidably positioned about the tapered end 130 is a spring retainer 140 having a protruding shoulder 142 to receive spring 144. The other end of spring 144 is urged against shoulder 146 formed within housing member 148.

Received within bore 132 of piston 110 is a hollow stem or cylinder 150. One end of stem 150 is formed with a groove 152 to receive a seal 154. The other end of stem 150 includes a conically shaped valve seat 156. A filter 170 is received between shoulder 172 of and housing member 148. The volume 174 between shoulder 176 and housing member 148 defines an accumulator chamber into which brake fluid at accumulator pressure is received via port 62c. Slidably received within an end 180 of bore 92, is a hollow valve member 182 having a central through passage 184 and a flared end 186 which receives. a spring 188. The end 186 includes a bore 190 into which is press fit a ball valve 192.

During the operation of the system, the various components cooperate to generate a pressure, communicated to the various brake cylinders 12a-d, which is approximately five times higher than the pressure generated in either of the primary 22 or secondary 24 master cylinder chambers. The pump 42, driven by motor 48, provides a constant supply of fluid at a pressure typically higher than the expected brake pressure and is nominally fixed. The motor and the pump maintain the accumulator at a relatively high pressure of approximately 2,000 psi (13891 Kpa). With the brake pedal in its relaxed position no pressure is generated within the master cylinder 20. The accumulator pressure is communicated through port 62c to chamber 174 urging the member 182 and ball 192 against the valve seat 147 formed within the member 148.

Figure 4:
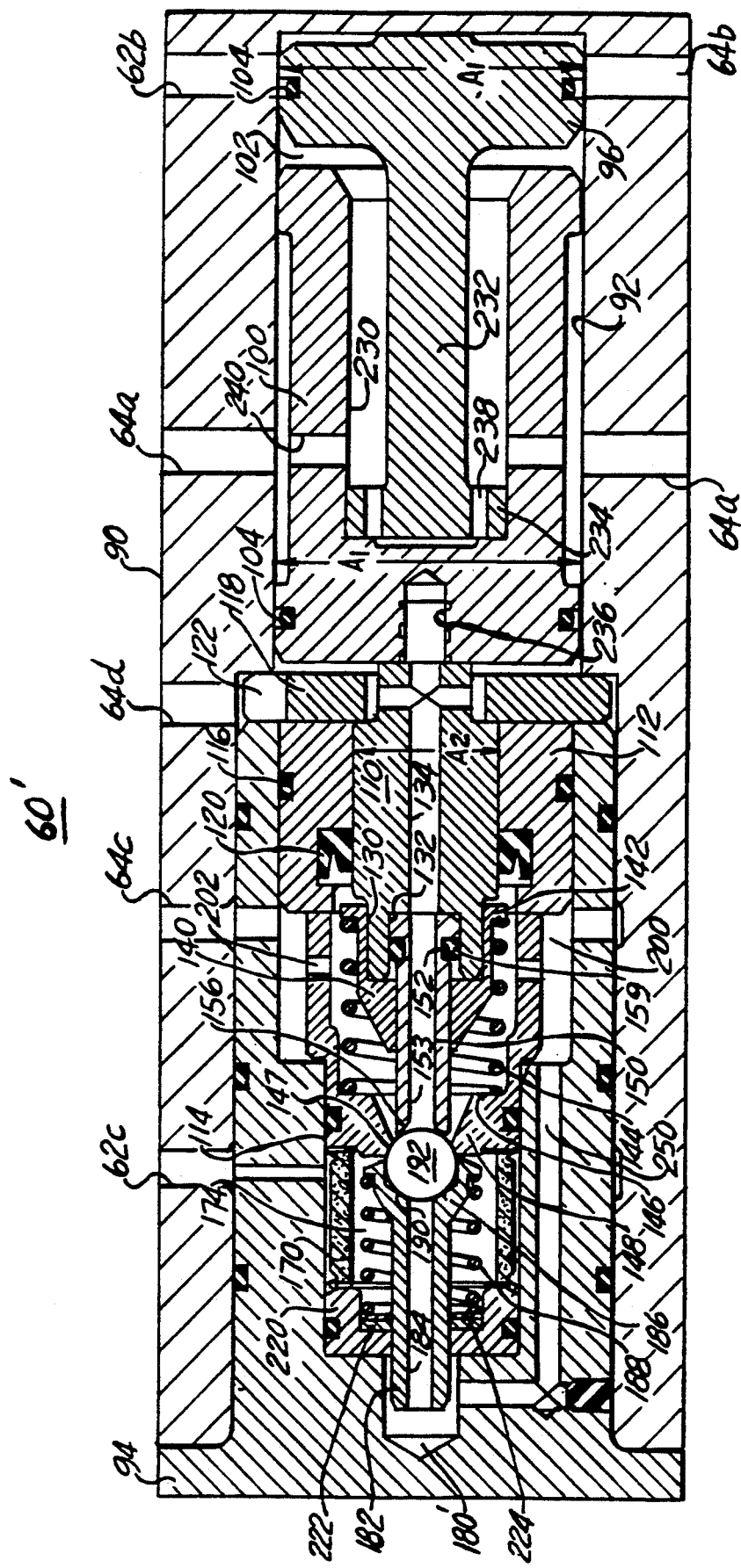
FIG. 4 illustrates an alternate embodiment of a pressure boost mechanism.

When the operator steps upon the brake pedal 28, the fluid pressure generated within chambers 102 and 98 connected to the primary and secondary chambers of the master cylinders increase. As the pressure in these chambers increases, the pistons 100 and 96 are urged to the left as viewed in FIG. 3, thereby urging the third piston 110 to the left against the bias force of spring 144 and accumulator pressure. The piston 110 may be integral with piston 100 or separate thereform as shown in FIG. 4. The movement of piston 110 similarly causes the stem 150 to move the ball 92 off from the valve seat 147 within housing member 148. This action permits fluid at accumulator pressure to flow into a boost chamber 200 communicated to outlet port 64c via the axial passage 202. As can be seen, fluid pressure within the boost chamber 200 is effective to act upon the cross-sectional area $A_2$ of piston 110 (minus the area of the stem 150). Pressure forces arising from accumulator pressure are counterbalanced by the pressure forces generated by the pressure in chambers 102 or 98 acting upon the effective area $A_1$ of pistons 100 and/or 96. The pressure within the boost chamber 200 will rise until the pressure forces resulting from the accumulator pressure acting on the left side of piston 110 are balanced by the master cylinder generated pressure forces within either chamber 102 or 98 acting upon pistons 100 and 96 respectively. The steady state pressure in the boost chamber 200 can be approximated by the following equation where in the steady state the pressure balance is given by $$P_{200} \times A_2 = P_m \times A_1 \tag{1}$$

where $P_{200}$ is the pressure in the boost chamber 200, $A_2$ is effective the cross-sectional area of piston 110, $P_m$ is the master cylinder pressure generated by either the primary or the secondary master cylinder chambers and $A_1$ is the cross-sectional area of either piston 100 or piston 96. As such, the pressure $P_{200}$ can be approximated by the following:

$$P_{200} = P_m A_1 / A_2 \tag{2}$$

As mentioned above, the present invention has been designed to create a brake pressure which is approximately five times higher than master cylinder pressure.

This can be achieved by selecting the area $A_1$ approximately five times larger than the area $A_2$.

As also can be seen from FIG. 3, the pressure within the boost chamber 200 moves piston 110 to the right thereby permitting the ball 192 to seat against the spherically shaped valve seat 147.

It should be noted that because of the serial placement of pistons 100 and 96 and the chambers 102 and 98 which are fed respectively by the primary and secondary master cylinder chambers 24 and 22 if one or the other of the master cylinder chambers fail, i.e., because for example of a leak, the boost mechanism 60 will still be able to operate and generate a boosted pressure within the boost chamber.

When the operator releases pedal 28 the pressures within chambers 102 and 98 reduce, permitting pistons 110, 100 and 96 to move to the right (as viewed in FIG. 3). This action moves the stem 150 away from the ball 192 and provides a flow path through passage 153 of stem 150 to chamber 122 permitting the pressure of the fluid within the various brake cylinders 12a-d to reduce as the fluid within the cylinders flows to the reservoir 26.

As can be appreciated from the above, the pressure generated within either of the master cylinder chambers 22 and 24 is not directly used, during normal service brake operation, to control the pressures within any of the brake cylinders 12a-d. If however, there is a malfunction in the motor 48 or the pump 42 or the electronics driving the motor, which prohibits the generation of a boost pressure that is not sufficient to cause either of the isolation valves 70a and 70b to change state, then the pressure generated within the master cylinder chambers 22 and 24 will be communicated through its respective isolation valve 70a or 70b to the corresponding brake cylinders providing direct pressure control of these brake cylinders at albeit a lower pressure level than would be generated during normal operation of the system.

Reference is now made to FIG. 4 which illustrates an alternate embodiment of a pressure boost mechanism 60'. The boost mechanism 60' includes a housing 90 that includes a stepped bore 92. The housing is enclosed by a cap which is positioned oppositely as compared to the cap 94 shown in FIG. 3. Situated within the stepped bore 92 are the first and second pistons 96 and 100 respectively. In the embodiment shown in FIG. 4 piston 100 is cup shaped and includes a central bore 230. Piston 96 includes a narrow center member 232, an end member 234 received within bore 230. As can be appreciated the longer length pistons (as compared to the pistons shown in FIG. 3) have a diameter substantially equal to the pistons shown in FIG. 3. This increased length-to-diameter ratio, about 7:4, will prevent the cocking of the pistons as they slide within the bore 92. The second piston 100 includes a tapped hole 236 to provide for easy removal of the piston. The end member 234 of piston 96 also includes a plurality of passages 238 which will prevent fluid from being trapped in the lower portion of bore 230. The second piston 100 includes flow passages 240 which assist in the communication of fluid at master cylinder pressure, received through port 64a, to the second piston 100.

Positioned to the left of the second piston 100 is a spacer or washer 118. Situated to the left of the washer is a third piston 110 slidably received within housing meter 112. A dynamic seal 120 provides for sealing between piston 110 and housing member 112. The piston 110 additionally includes the tapered end 130 and bore 132. Positioned around the tapered end is a spring retainer 140 which is identical to that shown in FIG. 3. A spring 144 is positioned about the spring retainer 140 and held in place by housing member 148. As in FIG. 3, housing member 148 defines the valve seat 147. The boost mechanism 60' additionally includes the hollow member 182 and ball valve 192. As can be seen, the mechanism 60' also includes the spacer 220 and filter 170. Fitted in the spacer 220 is a nylon ring 222 which seals against member 182. The spring 188 rests upon a metal spacer 224. The basic difference in the embodiment shown in FIG. 4 compared to that shown in FIG. 3, is the communication of the fluid within the boost chamber 200 via passage 250 to the bore 180' situated at the left side of member 182. As can be appreciated, the member 182 and ball 190 are now pressure balanced with regard to the pressure of the fluid residing in chamber 200. Consequently, upon movement of piston 110 less effort is required to unseat ball 192. As can be appreciated a force is needed to unseat ball 194 and must be sufficient to overcome the bias force of spring 188 and the diminished pressure forces resulting from fluid, at accumulator pressure, within chamber 174 which now only act upon the area in contact with ball 192 at seat 147. This should be contrasted with the pressure forces generated in the embodiment shown in FIG. 3 wherein fluid at accumulator pressure acts upon the entire cross-sectional area of the member 182 (including the enlarged end 186).

Many changes and modifications in the above described embodiment of the invention can, of course, be carried out without departing from the scope thereof. Accordingly, that scope is intended to be limited only by the scope of the appended claims.

We claim:

1. A pressure boost mechanism for use in a brake system comprising a pressure boost mechanism (60) adapted to be connected to an accumulator (40) and primary and secondary chambers of a master cylinder for generating a boosted pressure at a fixed multiple of the pressure in either the primary or secondary master cylinder chambers comprising:

a housing (90) including a stepped bore (92), an accumulator chamber (174) adapted to receive fluid from the accumulator (40) at one end of the bore (92), and a boost chamber (200) within an adjacent first housing member (148);

the first housing member (148) including a first valve seat (147) at one end thereof proximate the accumulator chamber;

a first valve member (182, 192) slidably received in the housing (90) spring biased to seat against the first valve seat (147) to prohibit fluid flow into or out of the accumulator chamber (174); the first valve member (182, 192) comprising a hollow stem (182) one end of which receives a ball valve (192)

a hollow second valve member (150) located within the boost chamber (200) having a second valve seat (156) at one end thereof for urging the first valve member (182, 192) away from the first valve seat (147), the second valve member being spring biased away from engagement with the first valve member (182, 192);

first piston means (100, 110) having a first piston portion (100) of area $A_1$ adapted to receive pressure generated in the master cylinder (20) and a second piston portion (110) of area $A_2$, where area $A_1$ is greater than area $A_2$, the second piston portion (110) including a passage (134) in communication with a central passage (153) of the second valve member (150), the second piston portion (110) operably mated to another end of the second valve member (150), the passage (132) in the second piston (110) is communicated to a reservoir chamber (122), wherein in response to the build up of master cylinder pressure, $P_m$, the first piston means (100, 110) is moved to cause the second valve member (150) to move the first valve member (182, 192) away from the first valve seat (147) permitting fluid from the accumulator chamber (174) to flow into the boost chamber (200) to act upon the second piston portion (110) in opposition to the master cylinder pressure acting as the first piston means (100), wherein the pressure $P_{200}$ within the boost chamber (200) in the steady state, will rise to approximately:

$$P_{200} = P_m (A_1/A_2).$$

2. A brake system (10) comprising:
a plurality of hydraulic brake mechanisms (12a–d), associated with each wheel of a vehicle;
a master cylinder (20) including a primary (22) and a secondary (24) chamber and a reservoir (26);
pressure boost means for generating a boosted pressure that is a fixed percentage above the pressure in either the primary 22 or secondary 24 chamber;
an accumulator (40),
a pump (42) having a first inlet (46a) and a second outlet (b), first outlet port connected to a reservoir (26) of the master cylinder (20) and the second outlet port (b) connected to the accumulator (40).
a motor (50) for selectively driving the pump as a function of system pressure,
a pressure boost mechanism (60) connected to the accumulator (40) and the primary and secondary chambers of the master cylinder for generating a boosted pressure at a fixed multiple of the pressure in either the primary or secondary master cylinder chambers;
a first isolation valve (70a) having an on and off operating state, connected to the primary chamber 22 via the boost mechanism (60);
a second isolation valve (70b) having an on and off operating state connected to the secondary chamber 24 via the boost mechanism (60)
a first proportional solenoid valve (80a) including an inlet port (82) and at least one outlet port (84a, 84b) connected to the first isolation valve (70a) for receiving at the inlet port (82a) primary chamber pressure or boost pressure as a function of the operating state of the first isolation valve (70a), said at least one outlet port communicated to one or more brake mechanisms (12a–d);

a second proportional solenoid valve (80a) having an inlet port (82a) and at least one outlet port (84a, 84b) connected to the second isolation valve (70b) for receiving at the inlet port (82a) secondary chamber pressure or boost pressure as a function of the operating state of the second isolation valve (70b), said at least one outlet port communicated to one or more brake mechanisms (12a–d),
wherein the pressure boost mechanism (60) comprises:
a housing (90) including a stepped bore (92), an accumulator chamber (174) adapted to receive fluid from the accumulator (40) at one end of the bore (92), and a boost chamber (200) within an adjacent first housing member (148);
the first housing member (148) including a first valve seat (147) at one end thereof proximate the accumulator chamber;
a first valve member (182, 192) slidably received in the housing (90) spring biased to seat against the first valve seat (147) to prohibit fluid flow into or out of the accumulator chamber (174); the first valve member (182, 192) comprising a hollow stem (182) one end of which receives a ball valve (192)
a hollow second valve member (150) located within the boost chamber (200) having a second valve seat (156) at one end thereof for urging the first valve member (182, 192) away from the first valve seat (147), the second valve member being spring biased away from engagement with the first valve member (182, 192);
first piston means (100, 110) having a first piston portion (100) of area $A_1$ adapted to receive pressure generated in the master cylinder (20) and a second piston portion (110) of area $A_2$, where area $A_1$ is greater than area $A_2$, the second piston portion (110) including a passage (134) in communication with a central passage (153) of the second valve member (150), the second piston portion (110) operably mated to another end of the second valve member (150), the passage (132) in the second piston (110) is communicated to a reservoir chamber (122), such reservoir chamber (122) communicated to the reservoir (26) of the master cylinder (20), wherein in response to the build up of master cylinder pressure, $P_m$, the first piston means (100, 110) is moved to cause the second valve member (150) to move the first valve member (182, 192) away from the first valve seat (147) permitting fluid from the accumulator chamber (174) to flow into the boost chamber (200) to act upon the second piston portion (110) in opposition to the master cylinder pressure acting as the first piston means (100), wherein the pressure $P_{200}$ within the boost chamber (200) in the steady state, will rise to approximately:

$$P_{200} = P_m (A_1/A_2).$$

* * * * *